(12) United States Patent
Akai et al.

(10) Patent No.: US 12,448,511 B2
(45) Date of Patent: Oct. 21, 2025

(54) UNSATURATED POLYESTER RESIN COMPOSITION, MOLDING MATERIAL, MOLDED ARTICLE, AND BATTERY PACK HOUSING FOR ELECTRIC VEHICLES

(71) Applicant: JAPAN COMPOSITE CO., LTD., Tokyo (JP)

(72) Inventors: Ikuo Akai, Shizuoka (JP); Masahiro Hakotani, Shizuoka (JP); Takashi Tsukamoto, Shizuoka (JP)

(73) Assignee: JAPAN COMPOSITE CO., LTD., Tokyo (JP)

( * ) Notice: Subject to any disclaimer, the term of this patent is extended or adjusted under 35 U.S.C. 154(b) by 629 days.

(21) Appl. No.: 17/284,703

(22) PCT Filed: Oct. 16, 2019

(86) PCT No.: PCT/JP2019/040700
§ 371 (c)(1),
(2) Date: Apr. 12, 2021

(87) PCT Pub. No.: WO2020/080412
PCT Pub. Date: Apr. 23, 2020

(65) Prior Publication Data
US 2021/0380801 A1 Dec. 9, 2021

(30) Foreign Application Priority Data

Oct. 19, 2018 (JP) ................................ 2018-197603

(51) Int. Cl.
| | |
|---|---|
| *C08L 67/03* | (2006.01) |
| *C08G 63/181* | (2006.01) |
| *C08J 5/24* | (2006.01) |
| *C08K 3/22* | (2006.01) |
| *C08K 3/32* | (2006.01) |
| *H01M 50/121* | (2021.01) |
| *H01M 50/222* | (2021.01) |
| *H01M 50/224* | (2021.01) |
| *H01M 50/227* | (2021.01) |
| *H01M 50/229* | (2021.01) |
| *H01M 50/231* | (2021.01) |
| *H01M 50/24* | (2021.01) |
| *H01M 50/271* | (2021.01) |
| *C08L 31/04* | (2006.01) |

(52) U.S. Cl.
CPC ............ *C08L 67/03* (2013.01); *C08G 63/181* (2013.01); *C08J 5/244* (2021.05); *C08J 5/249* (2021.05); *C08K 3/22* (2013.01); *C08K 3/32* (2013.01); *H01M 50/121* (2021.01); *H01M 50/222* (2021.01); *H01M 50/224* (2021.01); *H01M 50/227* (2021.01); *H01M 50/229* (2021.01); *H01M 50/231* (2021.01); *H01M 50/24* (2021.01); *H01M 50/271* (2021.01); *C08K 2003/2227* (2013.01); *C08K 2003/323* (2013.01); *C08L 31/04* (2013.01); *C08L 2201/02* (2013.01); *H01M 2220/20* (2013.01)

(58) Field of Classification Search
CPC ..... C08L 67/03; H01M 50/24; H01M 50/231; H01M 50/121; H01M 50/227; H01M 50/229; H01M 50/224; H01M 50/222; H01M 50/271; C08J 5/249; C08J 5/244; C08G 63/181; C08K 3/22; C08K 3/32
See application file for complete search history.

(56) References Cited

U.S. PATENT DOCUMENTS

| | | | | |
|---|---|---|---|---|
| 5,281,633 | A | * | 1/1994 | Okuno ................ C08L 67/06 523/171 |
| 2018/0009926 | A1 | * | 1/2018 | Kuroki ............... C09D 201/02 |
| 2021/0139629 | A1 | | 5/2021 | Akai et al. |
| 2021/0355292 | A1 | * | 11/2021 | Ushimi ............... C08G 18/092 |

FOREIGN PATENT DOCUMENTS

| | | | |
|---|---|---|---|
| CN | 105482399 A | | 4/2016 |
| CN | 111936537 A | | 11/2020 |
| JP | S 62-275154 | * | 11/1987 |
| JP | 2009-209269 A | | 9/2009 |
| JP | 2009197129 A | * | 9/2009 |
| JP | 2014-69384 A | | 4/2014 |
| JP | 2014167042 A | * | 9/2014 |
| WO | 2018/012205 A1 | | 1/2018 |

OTHER PUBLICATIONS

Tsukamoto JP 2009/197129 A (trans.) (Year: 2009).*
JP-2014167042-A (trans.) (Year: 2014).*
JP-2009197129-A (trans.) (Year: 2009).*
(Continued)

*Primary Examiner* — Robert C Boyle
(74) *Attorney, Agent, or Firm* — RANKIN, HILL & CLARK LLP

(57) ABSTRACT

An unsaturated polyester resin composition includes: a resin component comprising an unsaturated polyester, a polymerizable monomer, and a low profile agent; aluminum hydroxide; and a fire retardant. The unsaturated polyester is a polymerized product of polybasic acid and polyhydric alcohol. The polybasic acid has an ethylenic unsaturated double bond at a predetermined ratio. The polyvinyl acetate is blended as a low profile agent relative to the resin component at a predetermined ratio. Aluminum hydroxide is blended relative to the resin component at a predetermined ratio.

14 Claims, 1 Drawing Sheet

(56) References Cited

OTHER PUBLICATIONS

Liu, C.J., et al., The effect of the addition of a low profile additive on the curing shrinkage of an unsaturated polyester resin, 39.1 Polymer Eng'g & Sci. 18 (Year: 1999).*

Zhang, C., et al, The synthesis and properties of a reactive flame-retardant unsaturated polyester resin from a phosphorusOcontaining diacid, 22.12 Polymers for Adv. Techs. 1768 (Year: 2011).*

Translation of JPS 62-275154 (Year: 1987).*

* cited by examiner

UNSATURATED POLYESTER RESIN COMPOSITION, MOLDING MATERIAL, MOLDED ARTICLE, AND BATTERY PACK HOUSING FOR ELECTRIC VEHICLES

TECHNICAL FIELD

The present invention relates to an unsaturated polyester resin composition, molding material, molded article, and battery pack housing for electric vehicles. In particular, the present invention relates to an unsaturated polyester resin composition, a molding material containing the unsaturated polyester resin composition, a molded article containing a cured product of the molding material, and a battery pack housing for electric vehicles containing the cured product of the molding material.

BACKGROUND ART

Conventionally, molded articles containing a molding material (particularly, SMC (sheet molding compound)) containing unsaturated polyester resin are excellent in appearance, mechanical properties, water resistance, and anticorrosion, and therefore used partially in place of steel plates for automobiles.

Patent Document 1 proposed such a molding material, for example, a molding material containing unsaturated polyester resin, low profile agent, calcium carbonate as a filler, and carbon fiber as a reinforced fiber (for example, see Patent Document 1 below).

To be more specific, a molded article composed of such a molding material is used mainly in those parts that are required to have rigidity and heat resistance, such as an engine oil sump and rocker cover, other than trunk lids and bonnets, in combination with steel plates.

CITATION LIST

Patent Document

Patent Document 1: Japanese Unexamined Patent Publication No. 2009-209269

SUMMARY OF THE INVENTION

Problem to be Solved by the Invention

Recently, in view of lightweight, it is desired that such a molded article is used in combination with, other than steel plates, light metal.

However, the molded article composed of the molding material of Patent Document 1 has a linear expansion coefficient smaller than that of light metal. Therefore when the molded article is combined with light metal, there are disadvantages in that dimensional stability is poor due to the difference between the linear expansion coefficient of the molded article and that of the light metal.

Especially, when the molded article is integrally molded with light metal, the difference becomes more notable. There are disadvantages that the notable difference further decreases the dimensional stability.

Furthermore, such a molded article may be required to have low shrinkage to reduce warping or deformation and flame retardancy for delaying the fire spread at the time when the vehicle gets fire.

The present invention aims to provide: an unsaturated polyester resin composition for producing a molded article with excellent low shrinkage and flame retardancy, and excellent dimensional stability even though combined with a light metal component; a molding material containing the unsaturated polyester resin composition; a molded article containing the cured product of the molding material; and a battery pack housing for electric vehicles containing the cured product of the molding material.

Means for Solving the Problem

The present invention [1] includes an unsaturated polyester resin composition including: a resin component containing an unsaturated polyester, a polymerizable monomer, and a low profile agent; aluminum hydroxide; and a fire retardant, wherein the unsaturated polyester is a polymerized product of polybasic acid and polyhydric alcohol, the polybasic acid contains polybasic acid having an ethylenic unsaturated double bond, the polybasic acid having an ethylenic unsaturated double bond is blended in an amount of 80 mol % or more relative to 100 mol % of the polybasic acid, the low profile agent contains polyvinyl acetate, the polyvinyl acetate is blended in an amount of 3 parts by mass or more and 10 parts by mass or less relative to 100 parts by mass of the resin component, and the aluminum hydroxide is blended in an amount of 50 parts by mass or more and less than 150 parts by mass relative to 100 parts by mass of the resin component.

The present invention [2] includes the unsaturated polyester resin composition described in [1] above, wherein the fire retardant is blended in an amount of 15 parts by mass or more and 70 parts by mass or less relative to 100 parts by mass of the aluminum hydroxide.

The present invention [3] includes the unsaturated polyester resin composition described in [1] or [2] above, wherein the fire retardant is a phosphorus fire retardant.

The present invention [4] includes a molding material including the unsaturated polyester resin composition described in the above-described [1] to [3], and reinforced fiber, wherein in the unsaturated polyester resin composition, a filler-excluding component is contained in total of 40 vol % or more and 70 vol % or less, the filler-excluding component being a component excluding the aluminum hydroxide and a filler blended as necessary.

The present invention [5] includes a molded article containing the cured product of the molding material described in [4] above.

The present invention [6] includes the molded article described in [5] above having a linear expansion coefficient of 20 ppm/° C. or more and 25 ppm/° C. or less.

The present invention [7] includes the molded article described in [5] or [6] above to be used for a battery pack housing for electric vehicles.

The present invention [8] includes a battery pack housing for electric vehicles integrally containing: an aluminum member; and the molded article described in any one of the above-described [5] to [7].

Effects of the Invention

In the unsaturated polyester resin composition of the present invention, the polybasic acid of the unsaturated polyester contains a predetermined ratio of polybasic acid having an ethylenic unsaturated double bond.

In the unsaturated polyester resin composition of the present invention, polyvinyl acetate, i.e., a low profile agent, is at a predetermined ratio relative to the resin component.

Therefore, the molded article produced by using the unsaturated polyester resin composition has excellent low shrinkage and flame retardancy.

Furthermore, the unsaturated polyester resin composition of the present invention includes aluminum hydroxide, and a fire retardant. The aluminum hydroxide is contained at a predetermined ratio relative to the resin component.

The larger amount the aluminum hydroxide is blended in, the smaller the linear expansion coefficient of the molded article produced by using the unsaturated polyester resin composition becomes and contrastingly the better the flame retardancy becomes. On the other hand, the smaller amount the aluminum hydroxide is blended in, the larger the linear expansion coefficient of the above-described molded article becomes and contrastingly the lower the flame retardancy becomes.

Consequently, when the molded article is combined with light metal and the mixing ratio of aluminum hydroxide is adjusted in order to reduce the difference between the linear expansion coefficient of the molded article and that of light metal for the improvement of dimensional stability, the flame retardancy becomes insufficient.

Therefore, the unsaturated polyester resin composition includes a fire retardant.

As a result, the molded article produced by using the unsaturated polyester resin composition of the present invention has excellent dimensional stability and flame retardancy.

The molding material of the present invention contains the unsaturated polyester resin composition of the present invention, and therefore the molded article produced by using the molding material has excellent low shrinkage, excellent flame retardancy, and excellent dimensional stability even when combined with light metal.

The molded article of the present invention contains a cured product of the molding material of the present invention, and therefore has excellent low shrinkage, excellent flame retardancy, and excellent dimensional stability even when combined with light metal.

The battery pack housing for electric vehicles of the present invention includes the molded article of the present invention, and therefore has excellent low shrinkage, excellent flame retardancy, and excellent dimensional stability.

DESCRIPTION OF THE EMBODIMENTS

Figure 1:
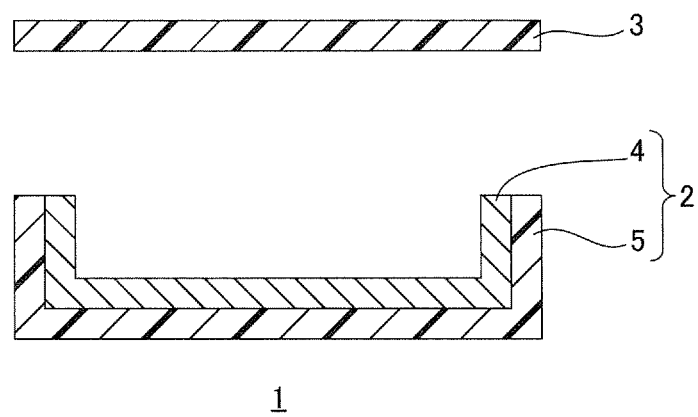
FIG. 1 is a cross-sectional view showing an embodiment of the battery pack housing for electric vehicles of the present invention.

The unsaturated polyester resin composition of the present invention contains a resin component, aluminum hydroxide, and a fire retardant.

The resin component contains an unsaturated polyester, polymerizable monomer, and low profile agent.

The unsaturated polyester is a polymerized product of polybasic acid and polyhydric alcohol.

The polybasic acid contains polybasic acid having an ethylenic unsaturated double bond (hereinafter, ethylenic unsaturated bond-containing polybasic acid) as an essential component and polybasic acid without an ethylenic unsaturated double bond (hereinafter, ethylenic unsaturated bond-noncontaining polybasic acid) as an optional component.

Examples of the ethylenic unsaturated bond-containing polybasic acid include ethylenic unsaturated aliphatic dibasic acid such as maleic acid, fumaric acid, itaconic acid, and dihydromuconic acid, halogenated product of these acids, and alkyl ester of these acids.

The ethylenic unsaturated bond-containing polybasic acid includes acid anhydride derived from the above-described ethylenic unsaturated aliphatic dibasic acids, for example, maleic anhydride.

Examples of the ethylenic unsaturated bond-containing polybasic acid include, preferably, maleic anhydride and fumaric acid.

Examples of the ethylenic unsaturated bond-noncontaining polybasic acid include saturated aliphatic polybasic acid, saturated alicyclic polybasic acid, aromatic polybasic acid, halogenated product of these acids, and alkyl ester of these acids.

Examples of the saturated aliphatic polybasic acid include saturated aliphatic dibasic acids such as oxalic acid, malonic acid, succinic acid, methyl succinic acid, 2,2-dimethyl succinic acid, 2,3-dimethyl succinic acid, hexyl succinic acid, glutaric acid, 2-methyl glutaric acid, 3-methyl glutaric acid, 2,2-dimethyl glutaric acid, 3,3-dimethyl succinic acid, adipic acid, pimelic acid, suberic acid, azelaic acid, and sebacic acid.

Examples of the saturated aliphatic polybasic acid include acid anhydride derived from the above-described saturated aliphatic dibasic acid, for example, oxalic anhydride and succinic anhydride.

Examples of the saturated alicyclic polybasic acid include saturated alicyclic dibasic acids such as HET acid, 1,2-hexahydrophthalic acid, 1,1-cyclobutane dicarboxylic acid, 1,4-cyclohexane dicarboxylic acid (cis- or trans-1,4-cyclohexane dicarboxylic acid or mixture thereof), and dimer acid.

Examples of the aromatic polybasic acid include aromatic dibasic acids such as phthalic acid (orthophthalic acid, isophthalic acid, terephthalic acid), trimellitic acid, and pyromellitic acid.

Examples of the aromatic polybasic acid include acid anhydride derived from the above-described aromatic dibasic acid, for example, phthalic anhydride.

Examples of the ethylenic unsaturated bond-noncontaining polybasic acid include, preferably, aromatic polybasic acid, and more preferably, aromatic dibasic acid, even more preferably, phthalic acid, and particularly preferably, isophthalic acid is used.

The polybasic acid can be used singly, or can be used in combination of two or more.

In the unsaturated polyester, polybasic acid contains a predetermined ratio of ethylenic unsaturated bond-containing polybasic acid.

To be specific, when the ethylenic unsaturated bond-containing polybasic acid and ethylenic unsaturated bond-noncontaining polybasic acid are used in combination, ethylenic unsaturated bond-containing polybasic acid is blended in an amount of 80 mol % or more, and for example, 99 mol % or less relative to the polybasic acid.

When the ethylenic unsaturated bond-containing polybasic acid is used singly, ethylenic unsaturated bond-containing polybasic acid is blended in an amount of 100 mol % (that is, 80 mol % or more) relative to polybasic acid.

Preferably, ethylenic unsaturated bond-containing polybasic acid is used singly.

In the unsaturated polyester, the polybasic acid has ethylenic unsaturated bond-containing polybasic acid in the above-described range, and therefore such unsaturated polyester has high reactivity.

Examples of the polyhydric alcohol include: dihydric alcohols including aliphatic diols such as alkane diols such as ethylene glycol, propylene glycol (1,2- or 1,3-propanediol or mixture thereof), butylene glycol (1,2- or 1,3- or 1,4-butylene glycol or mixture thereof), 1,5-pentanediol, 1,6-hexanediol, neopentyl glycol, 2-methyl-1,3-propanediol, 2-butyl-2-ethyl-1,3-propanediol, 3-methyl-1,5-pentanediol, 2,2,2-trimethylpentane diol, and 3,3-dimethylolheptane, ether diol such as diethylene glycol, triethylene glycol, and dipropylene glycol, alicylic diols such as cyclohexanediol (1,2- or 1,3- or 1,4-cyclohexanediol or mixture thereof), cyclohexane dimethanol (1,2- or 1,3- or 1,4-cyclohexanedimethanol or mixture thereof), cyclohexane diethanol (1,2- or 1,3- or 1,4-cyclohexane diethanol or mixture thereof), and hydrogenated bisphenol A, and aromatic diols such as bisphenol A, ethylene oxide adduct of bisphenol A, and propylene oxide adduct of bisphenol A; trihydric alcohols such as glycerine, trimethylolpropane, and triisopropanol amine; tetrahydric alcohols such as tetramethylol methane (pentaerythritol) and diglycerol; pentahydric alcohols such as xylitol; hexahydric alcohols such as sorbitol, mannitol, allitol, iditol, dulcitol, altritol, inositol, and dipentaerythritol, and preferably, dihydric alcohol, more preferably, aliphatic diol, even more preferably, alkane diol, particularly preferably, propylene glycol and neopentyl glycol are used.

The polyhydric alcohol can be used singly, or can be used in combination of two or more, and preferably, propylene glycol and neopentyl glycol are used in combination.

Unsaturated polyester can be produced by polycondensation (condensation polymerization) of polybasic acid and polyhydric alcohol.

To carry out polycondensation (condensation polymerization) of polybasic acid and polyhydric alcohol, polyhydric alcohol is blended with polybasic acid so that the equivalent ratio thereof (hydroxyl group of polyhydric alcohol/carboxyl group of polybasic acid) is, for example, 0.9 or more, preferably 0.95 or more, and for example, 1.2 or less, preferably 1.1 or less, and the mixture is stirred under normal pressure in nitrogen atmosphere.

The reaction temperature is, for example, 150° C. or more, preferably 190° C. or more, and for example, 250° C. or less, preferably 230° C. or less.

The reaction time is, for example, 8 hours or more, and for example, 30 hours or less.

In the above-described reaction, as necessary, a known solvent and a known catalyst can also be blended.

In this manner, the unsaturated polyester is produced.

The unsaturated polyester has an acid value (measurement method: in accordance with JIS K6901 (2008)) of, for example, 20 mgKOH/g or more, and less than 40 mgKOH/g.

The unsaturated polyester has a weight-average molecular weight of, for example, 6000 or more, preferably 8000 or more, and for example, 25000 or less, preferably 20000 or less.

The weight-average molecular weight is polystyrene-based weight-average molecular weight by GPC (Gel Permeation Chromatography), and can be determined by GPC analysis with unsaturated polyester.

The unsaturated polyester is blended in an amount of, relative to the resin component, for example, 20 mass % or more, and for example, 60 mass % or less.

The polymerizable monomer is a solvent for dissolving the unsaturated polyester, and at the time of curing unsaturated polyester resin (described later), it is a crosslinkable monomer (reactive diluent) that can crosslink with the unsaturated polyester, and examples thereof include: styrene monomers such as styrene, α-methyl styrene, α-ethyl styrene, vinyl toluene, t-butyl styrene, and chloro styrene; (meth)acrylate monomers such as alkyl (meth)acrylates such as methyl (meth)acrylate, ethyl (meth)acrylate, isopropyl (meth)acrylate, butyl (meth)acrylate, n-butyl (meth)acrylate, t-butyl (meth)acrylate, isobutyl (meth)acrylate, 2-ethyl hexyl (meth)acrylate, lauryl (meth)acrylate, tri decyl (meth)acrylate, and stearyl (meth)acrylate, (meth)acrylic acid allyl esters such as (meth)acrylic acid allyl, cyclic-structure-containing (meth)acrylates such as (meth)acrylic acid cyclohexyl, (meth)acrylic acid benzyl, (meth)acrylic acid isobornyl, (meth)acrylic acid glycidyl, (meth)acrylic acid tetra hydro furfuryl, (meth)acrylic acid dicyclo pentenyl, (meth)acrylic acid dicyclo pentanyl, and (meth)acrylic acid dicyclo pentenyl oxy ethyl, (meth)acrylic acid hydroxy alkyl esters such as (meth)acrylic acid 2-hydroxy ethyl and (meth)acrylic acid 2-hydroxy propyl, (meth)acrylic acid alkoxy alkyl esters such as 2-methoxy ethyl (meth)acrylate and 2-ethoxy ethyl (meth)acrylate, (meth)acrylic acid amino alkyl esters such as (meth)acrylic acid dimethyl amino ethyl and (meth)acrylic acid diethyl amino ethyl and their chloride salts, and (meth)acrylic acid fluoro alkyl ester such as (meth)acrylic acid tri fluoro ethyl and (meth)acrylic acid hepta decafluo decyl; polyfunctional (meth)acrylates such as ethylene glycol di(meth)acrylate, diethylene glycol di(meth)acrylate, trimethylolpropane tri(meth)acrylate, pentaerythritol tetra(meth)acrylate, and dipentaerythritol hexa(meth)acrylate; and allyl monomers such as glycerine monoallyl ether, pentaerythritol diallyl ether, pentaerythritol monoallyl ether, and trimethylolpropane monoallyl ether. Preferably, styrene monomer, more preferably, styrene is used. (Meth)acryl means methacryl and/or acryl.

The polymerizable monomer can be used singly, or can be used in combination of two or more.

The polymerizable monomer is blended in an amount of, relative to the resin component, for example, 20 mass % or more, and for example, 60 parts by mass % or less, preferably 50 parts by mass % or less.

The mixing ratio of the polymerizable monomer relative to 100 parts by mass of the unsaturated polyester is, for example, 50 parts by mass or more, and for example, 200 parts by mass or less, preferably 100 parts by mass or less.

The low profile agent is blended so as to suppress cure shrinkage and thermal shrinkage of the molded article (described later), when the molded article (described later) is produced by using the unsaturated polyester resin composition.

The low profile agent contains, as an essential component, polyvinyl acetate.

Polyvinyl acetate suppresses cure shrinkage and thermal shrinkage of the molded article (described later).

Therefore, when the low profile agent contains polyvinyl acetate, the molded article (described later) produced by using the unsaturated polyester resin composition has excellent low shrinkage.

The mixing ratio of the polyvinyl acetate relative to 100 parts by mass of the resin component is 3 parts by mass or more, preferably 5 parts by mass or more, and 10 parts by mass or less.

When the mixing ratio of the polyvinyl acetate is the above-described lower limit or more, the molded article (described later) produced by using the unsaturated polyester resin composition has excellent low shrinkage.

Meanwhile, when the mixing ratio of the polyvinyl acetate is less than the above-described lower limit, the low shrinkage of the molded article (described later) produced by using the unsaturated polyester resin composition is impaired.

When the mixing ratio of the polyvinyl acetate is the above-described upper limit or less, the molded article (described later) produced by using the unsaturated polyester resin composition has excellent low shrinkage.

Meanwhile, when the mixing ratio of the polyvinyl acetate is more than the above-described upper limit, film releasability at the time of molding material production decreases and thus production stability decreases.

The low profile agent also contains, as optional components, other low profile agents such as, for example, polystyrene, polyethylene, crosslinking polystyrene, polyvinyl acetate-polystyrene block copolymer, SBS (rubber), and saturated polyester resin.

The saturated polyester resin is produced by dissolving the saturated polyester in the above-described polymerizable monomer.

The saturated polyester is a polymerized product of the above-described ethylenic unsaturated bond-noncontaining polybasic acid and the above-described polyhydric alcohol.

As examples of the ethylenic unsaturated bond-noncontaining polybasic acid, preferably, saturated aliphatic polybasic acid and aromatic polybasic acid, or more preferably, saturated aliphatic dibasic acid and aromatic dibasic acid, and even more preferably, adipic acid and isophthalic acid is used.

The ethylenic unsaturated bond-noncontaining polybasic acid can be used singly, or can be used in combination of two or more.

As the polyhydric alcohol, preferably dihydric alcohol, and more preferably, neopentyl glycol is used.

The polyhydric alcohol can be used singly, or can be used in combination of two or more.

The saturated polyester can be produced by polycondensation (condensation polymerization) of the ethylenic unsaturated bond-noncontaining polybasic acid and polyhydric alcohol.

To carry out polycondensation (condensation polymerization) of the ethylenic unsaturated bond-noncontaining polybasic acid and polyhydric alcohol, polybasic acid is blended with polyhydric alcohol so that the equivalent ratio (hydroxyl group of polyhydric alcohol/carboxyl group of polybasic acid) of polyhydric alcohol relative to polybasic acid is, for example, 0.9 or more, preferably 0.95 or more, and for example, 1.2 or less, preferably 1.1 or less, and the mixture is stirred under normal pressure in nitrogen atmosphere.

The reaction temperature is, for example, 150° C. or more, preferably 190° C. or more, and for example, 250° C. or less, preferably 230° C. or less.

Examples of the reaction time include 8 hours or more, and for example, 30 hours or less.

In the above-described reaction, as necessary, a known solvent and a known catalyst can also be blended.

In this manner, the saturated polyester is produced.

The saturated polyester has an acid value (measurement method: in accordance with JIS K6901 (2008)) of, for example, 5 mgKOH/g or more and less than 40 mgKOH/g.

Then, the saturated polyester is dissolved in the above-described polymerizable monomer (preferably, styrene), and as necessary, an additive (a polymerization inhibitor (described later) (preferably, hydroquinone)) is added to prepare the saturated polyester resin.

In preparation of the saturated polyester resin, the mixing ratio of the polymerizable monomer relative to 100 parts by mass of the saturated polyester is, for example, 35 parts by mass or more, and 150 parts by mass or less, and for example, the mixing ratio of the polymerization inhibitor relative to 100 parts by mass of the saturated polyester is, for example, 0.001 parts by mass or more, preferably 0.005 parts by mass or more, and for example, 0.1 parts by mass or less, preferably 0.05 parts by mass or less.

The low profile agent can be used singly, or can be used in combination of two or more, and preferably, polyvinyl acetate and the saturated polyester resin are used in combination.

That is, the low profile agent preferably includes saturated polyester resin.

The mixing ratio of the saturated polyester relative to 100 parts by mass of the resin component is, for example, 8 parts by mass or more, preferably 10 parts by mass or more, and for example, 15 parts by mass or less.

The mixing ratio of the low profile agent relative to the resin component is, for example, 10 mass % or more, preferably 20 mass % or more, and for example, 50 parts by mass % or less.

The mixing ratio of the low profile agent relative to 100 parts by mass of the unsaturated polyester is, for example, 20 parts by mass or more, preferably 30 parts by mass or more, and for example, 70 parts by mass or less.

The resin component contains, as necessary, other thermosetting resin (excluding unsaturated polyester resin).

Examples of the other thermosetting resin include vinyl ester resin, brominated vinyl ester resin, and Acrysirup.

The vinyl ester resin is produced by dissolving vinyl ester in the above-described polymerizable monomer.

The vinyl ester is a reaction product of non-brominated epoxy resin and unsaturated monobasic acid.

The non-brominated epoxy resin is a reaction product of the first phenol component and the first epoxy component.

The first phenol component contains a non-brominated bisphenol compound.

The non-brominated bisphenol compound is represented by general formula (1) below.

[Chem 1]

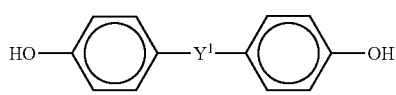

(1)

(where $Y^1$ represents one of —C(CH$_3$)$_2$—, —CH$_2$—, —O—, —S—, —(O=S=O)—)

Examples of the non-brominated bisphenol compound include bisphenol A, bisphenol F, and bisphenol S, and preferably, bisphenol A is used.

These non-brominated bisphenol compounds may be used singly or in combination of two or more.

The first epoxy component contains a non-brominated epoxy compound.

The non-brominated epoxy compound is represented by general formula (2) below.

[Chem 2]

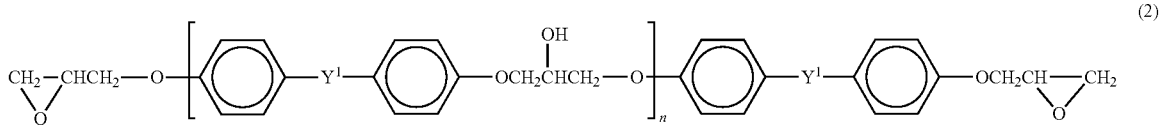

(2)

(where $Y^1$ is the same as $Y^1$ in the above-described formula (1), n represents an integer of 0 to 5)

For the non-brominated epoxy compound, for example, bisphenol A epoxy resin, bisphenol F epoxy resin, and bisphenol S epoxy resin are used.

The non-brominated epoxy compound has an epoxy equivalent of, for example, 100 g/eq or more, preferably 150 g/eq or more, and for example, 800 g/eq or less, preferably 400 g/eq or less, more preferably less than 300 g/eq, and even more preferably 250 g/eq or less.

These non-brominated epoxy compounds may be used singly or in combination of two or more.

To produce the non-brominated epoxy resin, the first phenol component is allowed to react with the first epoxy component. To be specific, the non-brominated bisphenol compound and non-brominated epoxy compound are blended, and the mixture is allowed to react.

In the above-described reaction, the non-brominated bisphenol compound and non-brominated epoxy compound are subjected to chain extension reaction.

In the above-described reaction, the first epoxy component relative to 1 equivalent of the first phenol component is 0.5 equivalent or more, preferably 1.0 equivalent or more, preferably 2.0 equivalent or more, and for example, 4.0 equivalent or less.

In the above-described reaction, as necessary, a catalyst can be added.

Examples of the catalyst include amines such as triethyl amine and benzyl dimethyl amine; quaternary ammonium salts such as tetramethyl ammonium chloride and triethyl benzyl ammonium chloride; imidazoles such as 2-ethyl-4-imidazole; amides; pyridines; phosphines such as triphenylphosphine; phosphonium salts such as tetraphenyl phosphonium bromide and ethyl triphenyl phosphonium bromide; sulfonium salts; sulfonic acids; organic metal salts such as octylic acid zinc; and preferably, quaternary ammonium salt, more preferably, triethyl benzyl ammonium chloride is used.

These catalysts may be used singly or in combination of two or more.

The catalyst is blended in an amount of, relative to 100 parts by mass of a total amount of the first phenol component and first epoxy component, for example, 0.01 parts by mass or more, preferably 0.1 parts by mass or more, and for example, 3.0 parts by mass or less, preferably 1.0 part by mass or less.

In the above-described reaction, as necessary, a polymerization inhibitor (described later) (preferably, hydroquinone)) can be added.

The polymerization inhibitor is blended in an amount of, relative to 100 parts by mass of a total amount of the first phenol component and first epoxy component, for example, 0.001 parts by mass or more, preferably 0.005 parts by mass or more, and for example, 0.5 parts by mass or less, preferably 0.1 parts by mass or less.

The reaction conditions are as follows: the reaction temperature is, for example, 80° C. or more, preferably 100° C. or more, and for example, 170° C. or less, and reaction time is, 1 hour or more, preferably 3 hours or more, and for example, 12 hours or less, preferably 10 hours or less.

In this manner, non-brominated epoxy resin is produced.

The non-brominated epoxy resin has an epoxy equivalent of, for example, 200 g/eq or more, preferably 300 g/eq or more, and for example, 800 g/eq or less, preferably 400 g/eq or less.

Examples of the unsaturated monobasic acid include monocarboxylic acids such as (meth)acrylic acid, crotonic acid, cinnamic acid, and sorbic acid; and a reaction product of dibasic acid anhydride and alcohol having at least one unsaturated group in its molecule. Examples of the dibasic acid anhydride include maleic anhydride, succinic anhydride, phthalic anhydride, tetra hydrophthalic anhydride, and hexa hydrophthalic anhydride. Examples of the alcohol having an unsaturated group include hydroxy ethyl (meth)acrylate, hydroxy propyl (meth)acrylate, hydroxy butyl (meth)acrylate, pentaerythritol tri (meth)acrylate, and glycerine di (meth)acrylate.

The unsaturated monobasic acid can be used singly, or can be used in combination of two or more.

For the unsaturated monobasic acid, preferably, monocarboxylic acid, more preferably, (meth)acrylic acid, and even more preferably, methacrylic acid is used.

To produce the vinyl ester, non-brominated epoxy resin is allowed to react with the unsaturated monobasic acid.

In the above-described reaction, the epoxy group of non-brominated epoxy resin and the unsaturated monobasic acid are subjected to addition reaction.

In the above-described reaction, the equivalent of the carboxyl group of the unsaturated monobasic acid relative to the epoxy group of non-brominated epoxy resin is, for example, 1 or more, preferably 1.5 or more, and for example, 2.5 or less.

The reaction conditions are as follows: the reaction temperature is, for example, 80° C. or more, preferably 100° C. or more, and for example, 150° C. or less, preferably 130° C. or less, and the reaction time is, for example, 1 hour or more, preferably 2 hours or more, and for example, 10 hours or less.

The above-described reaction can also be carried out following the above-described reaction between the first phenol component and first epoxy component.

In this manner, vinyl ester is produced.

The vinyl ester has an acid value (measurement method: in accordance with JIS K6901 (2008)) of, for example, 5 mgKOH/g or more, and 20 mgKOH/g or less.

Then, the vinyl ester is dissolved in the above-described polymerizable monomer (preferably, styrene) to prepare vinyl ester resin.

Brominated vinyl ester resin is produced by dissolving brominated vinyl ester in the above-described polymerizable monomer.

The brominated vinyl ester resin is a reaction product of brominated epoxy resin and the above-described unsaturated monobasic acid.

The brominated epoxy resin is a reaction product of the second phenol component and second epoxy component.

The second phenol component contains a brominated bisphenol compound.

The brominated bisphenol compound is represented by general formula (3) below.

[Chem 3]

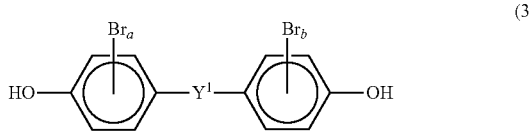

(where $Y^1$ is the same as $Y^1$ in the above-described formula (1), a and b independently represent an integer of 1 to 4)

For the brominated bisphenol compound, for example, tetra bromo bisphenol A ([2,2-bis(3,5-dibromo-4-hydroxyphenyl) propane), dibromo bisphenol A, tetra bromo bisphenol F, and tetra bromo bisphenol S are used.

These brominated bisphenol compounds may be used singly or in combination of two or more.

The second phenol component contains, as necessary, the above-described non-brominated bisphenol compound.

The second epoxy component contains a brominated epoxy compound.

The brominated epoxy compound is represented by general formula (4) below.

[Chem 4]

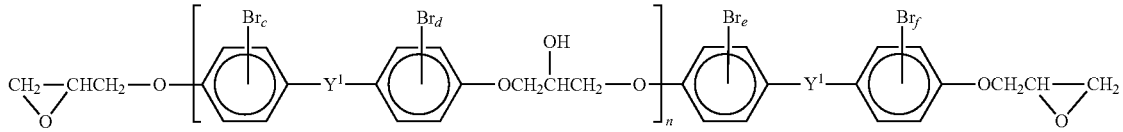

(where $Y^1$ is the same as $Y^1$ in the above-described formula (1), c to f independently represent an integer of 1 to 4, n represents an integer of 0 to 5)

For the brominated epoxy compound, for example, tetra bromo bisphenol A epoxy resin, dibromo bisphenol A epoxy resin, tetra bromo bisphenol F epoxy resin, and tetra bromo bisphenol S epoxy resin are used.

The brominated epoxy compound has an epoxy equivalent of, for example, 100 g/eq or more, preferably 200 g/eq or more, more preferably 300 g/eq or more, and for example, 1000 g/eq or less, preferably 600 g/eq or less.

These brominated epoxy compounds may be used singly or in combination of two or more.

The second epoxy component contains, as necessary, the above-described non-brominated epoxy compound.

To produce brominated epoxy resin, the second phenol component is allowed to react with the second epoxy component. To be specific, the brominated bisphenol compound and brominated epoxy compound, non-brominated bisphenol compound blended as necessary, and non-brominated epoxy compound blended as necessary are blended, and the mixture is allowed to react.

In the above-described reaction, the brominated bisphenol compound, brominated epoxy compound, non-brominated bisphenol compound blended as necessary, and non-brominated epoxy compound blended as necessary are subjected to chain extension reaction.

In the above-described reaction, the second epoxy component relative to 1 equivalent of the second phenol component is 0.5 equivalent or more, preferably 1.0 equivalent or more, preferably 2.0 equivalent or more, and for example, 4.0 equivalent or less.

In the above-described reaction, as necessary, the above-described catalyst can be added.

For the catalyst, preferably, quaternary ammonium salt, more preferably, triethyl benzyl ammonium chloride is used.

The catalyst is blended in an amount of, relative to 100 parts by mass of a total amount of the second phenol component and second epoxy component, for example, 0.01 parts by mass or more, preferably 0.1 parts by mass or more, and for example, 3.0 parts by mass or less, preferably 1.0 part by mass or less.

In the above-described reaction, as necessary, a polymerization inhibitor (described later) (preferably, hydroquinone)) can be added.

The polymerization inhibitor is blended in an amount of, relative to 100 parts by mass of a total amount of the second phenol component and second epoxy component, for example, 0.001 parts by mass or more, preferably 0.005 parts by mass or more, and for example, 0.5 parts by mass or less, preferably 0.1 parts by mass or less.

The reaction conditions are as follows: the reaction temperature is, for example, 80° C. or more, preferably 100° C. or more, and for example, 150° C. or less, preferably 130° C. or less, and the reaction time is, for example, 1 hour or more, preferably 3 hours or more, and for example, 12 hours or less, preferably 10 hours or less.

In this manner, brominated epoxy resin is produced.

The brominated epoxy resin has an epoxy equivalent of, for example, 200 g/eq or more, preferably 300 g/eq or more, and for example, 800 g/eq or less, preferably 500 g/eq or less.

The brominated epoxy resin has a bromine content of, for example, 20 mass % or more, preferably 30 mass % or more, and for example, 60 mass % or less.

The bromine content of brominated epoxy resin can be determined by ion chromatography.

To produce the brominated vinyl ester, brominated epoxy resin is allowed to react with the above-described unsaturated monobasic acid (preferably, methacrylic acid).

In the above-described reaction, the epoxy group of brominated epoxy resin and unsaturated monobasic acid are subjected to addition reaction.

In the above-described reaction, the equivalent of the carboxyl group of unsaturated monobasic acid relative to the epoxy group of brominated epoxy resin is, for example, 0.5 or more, preferably 1.0 or more, and for example, 2.5 or less.

The reaction conditions are as follows: the reaction temperature is, for example, 80° C. or more, preferably 100° C.

or more, and for example, 150° C. or less, preferably 130° C. or less, and the reaction time is, for example, 1 hour or more, preferably 2 hours or more, and for example, 10 hours or less, preferably 6 hours or less.

The above-described reaction can be carried out following the above-described reaction between the second phenol component and second epoxy component.

In this manner, brominated vinyl ester is produced.

The brominated vinyl ester has an acid value (measurement method: in accordance with JIS K6901 (2008)) of, for example, 5 mgKOH/g or more, and 20 mgKOH/g or less.

Then, by dissolving the brominated vinyl ester in the above-described polymerizable monomer (preferably, styrene), brominated vinyl ester resin is prepared.

The brominated vinyl ester resin has a bromine content of, for example, 10 mass % or more, preferably 20 mass % or more, and for example, 40 mass % or less.

The bromine content of the brominated vinyl ester resin can be determined by ion chromatography.

The other thermosetting resin is blended in an amount of, relative to the resin component, for example, 15 mass % or more, and for example, 40 mass % or less.

Aluminum hydroxide is blended to give flame retardancy, give transparency and color scales (shades) to the molded article (described later) produced by using the unsaturated polyester resin composition, and also to adjust the linear expansion coefficient of the molded article (described later).

The aluminum hydroxide has an average particle size of, for example, 1 μm or more, and for example, 50 μm or less, preferably 25 μm or less.

The average particle size of the aluminum hydroxide can be determined by creating a particle size distribution curve with a laser diffraction•scattering particle size distribution analyzer, and calculating the particle size corresponding to 50 mass %.

The aluminum hydroxide can be used singly, or aluminum hydroxide with different average particle sizes, and aluminum hydroxide with different sodium oxide contents can be used in combination of two or more.

The mixing ratio of the aluminum hydroxide relative to 100 parts by mass of the resin component is, 50 parts by mass or more, preferably 60 parts by mass or more, and less than 150 parts by mass, more preferably 125 parts by mass or less, and even more preferably 115 parts by mass or less.

The larger amount the aluminum hydroxide is blended in, the smaller the linear expansion coefficient of the molded article (described later) produced by using the unsaturated polyester resin composition becomes and contrastingly the better the flame retardancy becomes. On the other hand, the smaller amount the aluminum hydroxide is blended in, the larger the linear expansion coefficient of the molded article (described later) becomes and contrastingly the lower the flame retardancy becomes.

As for the unsaturated polyester resin composition, if the molded article (described later) produced by using the unsaturated polyester resin composition is combined with light metal, the mixing ratio of the aluminum hydroxide is adjusted in the described-above range so that the difference between the linear expansion coefficient of the molded article and that of the light metal decreases for the improvement of dimensional stability. Thus, as long as the mixing ratio of the aluminum hydroxide is in the above-described range, the molded article (described later) produced by using the unsaturated polyester resin composition has excellent dimensional stability even when combined with the light metal (described later).

On the other hand, when the mixing ratio of the aluminum hydroxide is less than the above-described lower limit and the molded article (described later) produced by using the unsaturated polyester resin composition is combined with the light metal (described later), the dimensional stability decreases and the flame retardancy excessively decreases.

Meanwhile, when the mixing ratio of the aluminum hydroxide is more than the above-described upper limit, the molded article (described later) produced by using the unsaturated polyester resin composition decreases in dimensional stability when combined with the light metal (described later).

However, only adjusting the mixing ratio of the aluminum hydroxide in the above-described range can improve the dimensional stability but cannot sufficiently keep the flame retardancy (Specifically, in a UL94 flame retardancy test (3 mm in thickness), V-0 standard cannot be achieved). Thus, the unsaturated polyester resin composition includes a fire retardant (described later).

Although it depends on the purpose or use, the molded article (described later) produced by using the unsaturated polyester resin composition does not necessarily achieve 5VA that is standard higher than V-0 standard.

The fire retardant is blended so as to give flame retardancy to the molded article (described later) produced by using the unsaturated polyester resin composition. More specifically, the fire retardant is blended so that the molded article can achieve V-0 standard because, as described above, only blending the aluminum hydroxide at the above-described mixing ratio cannot achieve V-0 standard in a UL94 flame retardancy test (3 mm in thickness).

Examples of the fire retardant include halogen fire retardants such as a bromine fire retardant; and non-halogen fire retardants such as a phosphorus fire retardant, an inorganic fire retardant, and a nitrogen compound fire retardant.

Examples of the bromine fire retardant include hexa bromo benzene; tetra bromo bisphenol; bromo diphenyls such as tetra bromo diphenyl, hexa bromo diphenyl, decabromo diphenyl, and decabromo diphenyl ethane (bis penta bromo phenyl ethane); and bromo diphenyl ethers such as tetra bromo diphenyl ether, hexa bromo diphenyl ether, and decabromo diphenyl ether.

Examples of the phosphorus fire retardant include red phosphorus; phosphoric acid esters such as trimethyl phosphate, triethyl phosphate, tributyl phosphate, and tricresyl phosphate; poly phosphoric acid salts such as poly phosphoric acid ammonium; an IFR (Intumescent) expandable fire retardant of a mixture of auxiliary agent such as poly phosphoric acid ammonium and pentaerythritol, and a carbon supplier such as melamine; and phosphinic acid metal salt.

For the phosphorus fire retardant, a commercially available product can be used, and to be specific, Exolit AP series (specifically, Exolit AP422 (poly phosphoric acid ammonium)), Op series (specifically, Exolit OP1230 (phosphinic acid metal salt)), and RP series (manufactured by Clariant) are used.

For the inorganic fire retardant, for example, antimony oxides such as diantimony trioxide, zinc stannate, boric acid zinc, and formulation thereof are used, and preferably, diantimony trioxide is used.

For the nitrogen compound fire retardant, for example, an azo alkane compound, hindered amine compound, and melamine compound are used.

For the fire retardant, preferably, a non-halogen fire retardant is used.

That is, preferably, the unsaturated polyester resin composition substantially contains no halogen fire retardant.

"Substantially contains no halogen fire retardant" means that relative to the unsaturated polyester resin composition the halogen fire retardant is, for example, 1.0 mass % or less, preferably 0.1 mass % or less.

When the unsaturated polyester resin composition substantially contains no halogen fire retardant, gas generation based on halogen at the time of burning can be suppressed, and thus environment pollution can be suppressed.

For the fire retardant, more preferably, a phosphorus fire retardant, even more preferably, phosphoric acid ester, and particularly preferably, poly phosphoric acid ammonium and phosphinic acid metal salt are used.

That is, more preferably, the unsaturated polyester resin composition contains a phosphorus fire retardant.

When the unsaturated polyester resin composition contains a phosphorus fire retardant, the flame retardancy improves.

The mixing ratio of the fire retardant relative to 100 parts by mass of the resin component is, for example, 5 parts by mass or more, preferably 15 parts by mass or more, preferably 25 parts by mass or more, and for example, 100 parts by mass or less, preferably 50 parts by mass or less.

The mixing ratio of the fire retardant relative to 100 parts by mass of the aluminum hydroxide is, for example, 3 parts by mass or more, preferably 5 parts by mass or more, more preferably 15 parts by mass or more, even more preferably 20 parts by mass or more, and for example, 80 parts by mass or less, preferably 70 parts by mass or less, more preferably 50 parts by mass or less.

When the mixing ratio of the fire retardant is the above-described lower limit or more, the molded article has excellent flame retardancy.

The mixing ratio of the fire retardant is the above-described upper limit or less keeps excellent flame retardancy while the reinforced fiber can be sufficiently impregnated with unsaturated polyester resin composition with excellent production stability.

The fire retardant can be used singly, or can be used in combination of two or more.

The unsaturated polyester resin composition can be produced by blending the resin component, aluminum hydroxide, and fire retardant at the above-described mixing ratio. To be specific, it can be produced by blending the unsaturated polyester, polymerizable monomer, low profile agent, and other thermosetting resin blended as necessary, aluminum hydroxide, and fire retardant at the above-described mixing ratio.

In this manner, the unsaturated polyester resin composition is produced.

In the unsaturated polyester resin composition, the mixing ratio of the resin component relative to the unsaturated polyester resin composition is, for example, 30 mass % or more, preferably 40 mass % or more, and for example, 60 parts by mass or less. The mixing ratio of the aluminum hydroxide relative to the unsaturated polyester resin composition is 20 mass % or more and, for example, 60 parts by mass or less, and 40 mass % or less. The mixing ratio of the fire retardant is, for example, 1 mass % or more, preferably 5 mass % or more and, for example, 20 mass % or less. The resin component, aluminum hydroxide, and fire retardant are contained in total, for example, 95 mass % or more and, for example, 100 mass % or less relative to the unsaturated polyester resin composition.

To the unsaturated polyester resin composition, as necessary, additives such as a polymerization inhibitor, curing agent, release agent, coloring agent, filler, and thickening agent can be blended. These additives can be used singly, or can be used in combination of two or more.

The polymerization inhibitor is blended to adjust pot life and curing reaction, and examples thereof include hydroquinone compounds such as hydroquinone, methyl hydroquinone, and t-butyl hydroquinone; benzoquinone compounds such as p-benzoquinone and methyl-p-benzoquinone; catechol compounds such as t-butyl catechol; phenol compounds such as 2,6-di-t-butyl-4-methyl phenol and 4-methoxy phenol; and N-oxyl compounds such as 1-oxyl-2,2,6,6-tetramethyl piperidine, 1-oxyl-2,2,6,6-tetramethyl piperidine-4-ol, 4-hydroxy-2,2,6,6-tetra piperidine-1-oxyl, 4-methoxy-2,2,6,6-tetramethyl piperidine-1-oxyl, 1-oxyl-2,2,6,6-tetramethyl piperidine-4-yl-acetate, 1-oxyl-2,2,6,6-tetramethyl piperidine-4-yl-2-ethyl hexanoate, 1-oxyl-2,2,6,6-tetramethyl piperidine-4-yl-stearate, 1-oxyl-2,2,6,6-tetramethyl piperidine-4-yl-4-t-butyl benzoate, bis(1-oxyl-2,2,6,6-tetramethyl piperidine-4-yl) succinic acid ester, bis(1-oxyl-2,2,6,6-tetramethyl piperidine-4-yl) adipic acid ester, bis(1-oxyl-2,2,6,6-tetramethyl piperidine-4-yl) sebacate, bis(1-oxyl-2,2,6,6-tetramethyl piperidine-4-yl) n-butyl malonic acid ester, bis(1-oxyl-2,2,6,6-tetramethyl piperidine-4-yl) phthalate, bis(1-oxyl-2,2,6,6-tetramethyl piperidine-4-yl) isophthalate, bis(1-oxyl-2,2,6,6-tetramethyl piperidine-4-yl) terephthalate, bis(1-oxyl-2,2,6,6-tetramethyl piperidine-4-yl) hexa hydro terephthalate, N,N'-bis(1-oxyl-2,2,6,6-tetramethyl piperidine-4-yl) adipamide, N-bis(1-oxyl-2,2,6,6-tetramethyl piperidine-4-yl) caprolactam, N-bis(1-oxyl-2,2,6,6-tetramethyl piperidine-4-yl) dodecyl succinimide, 2,4,6-tris-[N-butyl-N-(1-oxyl-2,2,6,6-tetramethyl piperidine-4-yl)]-s-triazine, 1-oxyl-2,2,6,6-tetramethyl piperidine-4-one, and preferably, a benzoquinone compound, more preferably, p-benzoquinone is used.

The mixing ratio of the polymerization inhibitor relative to 100 parts by mass of the resin component is, for example, 0.01 parts by mass or more, and for example, 0.1 parts by mass or less.

The polymerization inhibitor can be used singly, or can be used in combination of two or more.

Examples of the curing agent include peroxides such as benzoyl peroxide, t-butyl peroxy isopropyl monocarbonate, t-amyl peroxy isopropyl monocarbonate, t-hexyl peroxy isopropyl monocarbonate, 1,1-bis(t-butyl peroxy) cyclohexane, t-butyl peroxy-2-ethyl hexanoate, amyl peroxy-2-ethyl hexanoate, 2-ethyl hexyl peroxy-2-ethyl hexanoate, t-butyl peroxy benzoate, t-hexyl peroxy benzoate, and t-hexyl peroxy acetate, and preferably, peroxy isopropyl monocarbonates, i.e., t-butyl peroxy isopropyl monocarbonate, t-amyl peroxy isopropyl monocarbonate, t-hexyl peroxy isopropyl monocarbonate, and t-butyl peroxy benzoate is used.

The mixing ratio of the curing agent relative to 100 parts by mass of the resin component is, for example, 0.5 parts by mass or more, preferably 0.8 parts by mass or more, and for example, 10 parts by mass or less, preferably 3 parts by mass or less.

The curing agent can be used singly, or can be used in combination of two or more.

Examples of the release agent include fatty acids such as stearic acid and lauric acid; fatty acid metal salts such as zinc stearate and calcium stearate; paraffin; liquid wax; fluorine polymer; and silicon polymer, and preferably, fatty acid metal salt, more preferably, zinc stearate is used.

The mixing ratio of the release agent relative to 100 parts by mass of the resin component is, for example, 1 part by mass or more, preferably 3 parts by mass or more, and for example, 10 parts by mass or less.

The release agent can be used singly, or can be used in combination of two or more.

Examples of the coloring agent include, without particular limitation, for example, titanium oxide, polyester toner (titanium oxide and/or carbon black-containing polyester coloring agent), and preferably, polyester toner is used.

The mixing ratio of the coloring agent relative to 100 parts by mass of the resin component is, for example, 1 part by mass or more, preferably 3 parts by mass or more, and for example, 20 parts by mass or less.

The coloring agent can be used singly, or can be used in combination of two or more.

Examples of the filler include inorganic fillers such as the following: oxides such as alumina and titania; hydroxides such as magnesium hydroxide (excluding aluminum hydroxide); carbonates such as calcium carbonate; sulfates such as barium sulfate; silica (for example, crystalline silica, molten silica, fumed silica, dry silica (aerosil), etc.); glass powder; hollow fillers such as glass balloon, silica balloon, and alumina balloon; silicates such as silica sand, diatomite, mica, clay, kaolin, and talc; fluorides such as fluorite; phosphoric acid salts such as calcium phosphate; and clay minerals such as smectite.

The mixing ratio of the filler relative to 100 parts by mass of the resin component is, for example, 1 part by mass or more, preferably 3 parts by mass or more, and for example, 50 parts by mass or less, preferably 30 parts by mass or less.

The filler can be used singly, or can be used in combination of two or more.

A wetting and dispersing agent is blended so as to reduce the viscosity of the unsaturated polyester resin composition to a suitable one for heat compression molding, and a known wetting and dispersing agent such as phosphoric acid polyester is used. For the wetting and dispersing agent, a commercially available product can be used, and to be specific, BYK-W996 (manufactured by BYK-Chemie) is used.

The mixing ratio of the wetting and dispersing agent relative to 100 parts by mass of the resin component is, for example, 0.1 part by mass or more, and for example, 10 parts by mass or less.

The wetting and dispersing agent can be used singly, or can be used in combination of two or more.

The thickening agent is blended so as to increase the viscosity of the unsaturated polyester resin composition to a suitable one for heat compression molding, and preferably, it is blended before (preferably, immediately before) the reinforced fiber (described later) is impregnated with the unsaturated polyester resin composition. Examples thereof include alkaline earth metal oxides such as magnesium oxide; alkaline earth metal hydroxides such as magnesium hydroxide and calcium hydroxide; and preferably, alkaline earth metal oxide, more preferably, magnesium oxide is used.

The mixing ratio of the thickening agent relative to 100 parts by mass of the resin component is, for example, 0.5 parts by mass or more, and for example, 10 parts by mass or less, preferably 3 parts by mass or less.

The thickening agent can be used singly, or can be used in combination of two or more.

To the unsaturated polyester resin composition, as necessary, additives such as, for example, a patterning material, antibacterial, hydrophilic agent, photocatalyst, ultraviolet absorber, ultraviolet ray stabilizer, separation preventing agent, silane coupling agent, antistatic agent, thixotropic agents, thixotropic stabilizer, and polymerization accelerator can be blended to the extent that will not hinder the effects of the invention. These additives can be used singly, or can be used in combination of two or more.

In the description above, the unsaturated polyester, polymerizable monomer, low profile agent, and other thermosetting resin blended as necessary, aluminum hydroxide, fire retardant, and additives blended as necessary are blended to produce an unsaturated polyester resin composition. However, the following is also possible: first, the unsaturated polyester is dissolved in a polymerizable monomer to prepare an unsaturated polyester resin, and thereafter, the produced unsaturated polyester resin, polymerizable monomer, low profile agent, other thermosetting resin blended as necessary, aluminum hydroxide, and additives blended as necessary can be blended.

In preparation of the unsaturated polyester resin, the unsaturated polyester and polymerizable monomer are blended, and as necessary, suitably, the above-described additives (for example, a polymerization inhibitor) can be blended.

In preparation of the unsaturated polyester resin, the mixing ratio of the polymerizable monomer relative to 100 parts by mass of the unsaturated polyester is, for example, 35 parts by mass or more, and 150 parts by mass or less, and the mixing ratio of the polymerization inhibitor relative to 100 parts by mass of the unsaturated polyester is, for example, 0.001 parts by mass or more, preferably 0.005 parts by mass or more, and for example, 0.1 parts by mass or less, preferably 0.05 parts by mass or less.

By blending a known reinforced fiber such as glass fiber to such an unsaturated polyester resin composition, the molding material can be prepared. Then, from the molding material, a molded article can be produced by a known method.

Examples of the reinforced fiber include inorganic fiber such as glass fiber, carbon fiber, metal fiber, and ceramics fiber; organic fiber such as poly vinyl alcohol fiber, polyester fiber, polyamide fiber, fluorine resin fiber, and phenol fiber; natural fiber such as hemp and Kenaf, and preferably, inorganic fiber, more preferably, carbon fiber, glass fiber, even more preferably, glass fiber is used.

These examples of the reinforced fiber can be in the form of, for example, cloth such as roving cloth; mats such as chopped strand mat, performable strand mat, continuous strand mat, and surfacing mat; strand; roved; nonwoven fabric; paper, and preferably, it is roved.

Of these examples of the reinforced fiber, preferably, carbon fiber, glass fiber, more preferably, glass fiber is used. To be more specific, glass roving is preferably used, to be even more specific, chopped glass, which is glass roving cut into a predetermined length.

The length of the reinforced fiber is not particularly limited, and for example, it is 1.5 mm or more. When the above-described unsaturated polyester resin composition is used to prepare the molding material, in view of ensuring smoothness and improving strength even if the reinforced fiber is long, preferably 5 mm or more, more preferably 15 mm or more, and for example, 80 mm or less, preferably 40 mm or less.

The molding material can be produced as a sheet by, for example, impregnating the reinforced fiber with the unsaturated polyester resin composition.

The mixing ratio of the reinforced fiber (for example, when the reinforced fiber is glass fiber, hereinafter referred to as glass content) relative to a total amount of the unsaturated polyester resin composition and reinforced fiber is, for example, 5 mass % or more, preferably 10 mass % or more, and for example, 50 mass % or less, preferably 35 mass % or less.

The molding material can be prepared by a known method including, for example, SMC (sheet molding compound), TMC (thick molding compound), and BMC (bulk molding compound), and preferably, in view of improving the strength of the molded article, SMC and TMC, which are suitable for preparing a molding material in which long reinforced fiber (for example, 5 mm or more) is blended is used.

In this manner, a molding material including the above-described unsaturated polyester resin composition and reinforced fiber is produced.

Relative to the molding material, in the above-described unsaturated polyester resin composition, a filler-excluding component, (volume content), i.e., the component excluding aluminum hydroxide and a filler blended as necessary, in total amount (specifically, the total amount of the resin component, fire retardant, and the addictive agents other than the filler blended as necessary) is, for example, 40 vol % or more, preferably 50 vol % or more, more preferably 55 vol % or more, even more preferably 60 vol % or more, and for example, 70 vol % or less.

When the volume content of the filler-excluding component is the above-described lower limit or more and the above-described upper limit or less, the reinforced fiber can be sufficiently impregnated with unsaturated polyester resin composition, with excellent production stability.

The volume content of the aluminum hydroxide relative to the molding material is, for example, 10 vol % or more, and for example, 30 vol % or less, preferably 20 vol % or less.

The volume content of the reinforced fiber relative to the molding material is, for example, 15 vol % or more, and for example, 40 vol % or less, preferably 30 vol % or less.

The molding material contains the above-described unsaturated polyester resin composition, and thus the molded article produced by using the molding material has excellent low shrinkage, excellent flame retardancy, and excellent dimensional stability even when combined with light metal.

Then, the viscosity of the molding material is increased so that the molding material can be subjected to heat compression molding (described later), and it is aged preferably, for example, at 20° C. or more and 50° C. or less, for 8 hours or more and 120 hours or less.

In this manner, the molding material is formed into, for example, a sheet. That is, the molding material is in the form of a sheet.

The molded article can be produced by subjecting the molding material to heat compression molding by a known method.

The conditions of the heat compression molding are suitably set in accordance with purpose and use, and to be specific, the molding temperature is, for example, 100° C. or more, and for example, 200° C. or less, and the molding pressure is, for example, 0.1 MPa or more, preferably 1 MPa or more, more preferably 5 MPa or more, and for example, 20 MPa or less, preferably 15 MPa or less.

In this manner, the molding material is cured, and the molding material is molded.

In this manner, the molded article is produced.

The molded article contains the above-described cured product of the molding material, and therefore has excellent low shrinkage properties and excellent flame retardancy.

In the above-described unsaturated polyester resin composition, the polybasic acid contains the ethylenic unsaturated bond-containing polybasic acid at the above-described predetermined ratio. The above-described unsaturated polyester resin composition contains polyvinyl acetate at the above-described predetermined ratio. Furthermore, aluminum hydroxide is contained at the above-described predetermined ratio, and therefore the molded article produced by using the above-described unsaturated polyester resin composition has a linear expansion coefficient approximated to the linear expansion coefficient of light metal such as aluminum (the linear expansion coefficient of 23.0 ppm/° C.) and magnesium (the linear expansion coefficient of 25.4 ppm/° C.). This improves the dimensional stability of the molded article.

Specifically, the linear expansion coefficient of the above-described molded article is, for example, 20.0 ppm/° C. or more, preferably 21.5 ppm/° C. or more and, for example, 30.0 ppm/° C. or less, preferably 25.0 ppm/° C. or less.

When the light metal is aluminum, the absolute value of the difference between the linear expansion coefficient of the molded article and the linear expansion coefficient of the aluminum (linear expansion coefficient of the aluminum-linear expansion coefficient of the molded article) is, for example, 2 or less, preferably 1.3 or less.

Especially, when the molded article is integrally molded with aluminum, for example, for the battery pack housing for electric vehicles, the above-described difference tends to notably affect the dimensional stability.

However, as for the above-described molded article, the difference between the linear expansion coefficient of the molded article and that of the aluminum can be in the above-described range, and therefore, the molded article has excellent dimensional stability even when combined with light metal.

On the other hand, the linear expansion coefficient of the molded article composed of the molding material containing calcium carbonate such as the one in Patent Document 1 is 0 ppm/° C. or more and 16 ppm/° C. or less, and the difference from the linear expansion coefficient of light metal (for example, aluminum (linear expansion coefficient 23.0 ppm/° C.)) is large. Therefore, when such a molded article is combined with the light metal, there are disadvantages that the dimensional stability will be poor based on the following: the dimensional difference due to thermal change changes the gaps between parts and generates stress at joint portion; and sealing properties are decreased at sealed portion.

Examples of the light metal include aluminum and magnesium, and preferably, aluminum is used.

The measurement method for the linear expansion coefficient of the molded article is to be described later in Examples.

The molded article is preferably used in the battery pack housing for electric vehicles, more preferably in the lithium cell battery pack housing for electric vehicles.

As shown in FIG. 1, a battery pack housing 1 for electric vehicles includes a tray member 2, and a cover member 3 to be combined with the tray member 2.

The tray member 2 is a vessel that accommodates a battery (not shown), and includes an internal layer 4 as an aluminum member, and an external layer 5 laminated on the internal layer 4 as the above-described molded article.

The internal layer 4 has a one-side open box shape. The internal layer 4 is composed of aluminum.

The external layer 5 has a one-side open box shape similar to that of the internal layer 4, and also has a size and shape so that the external layer 5 can accommodate the internal layer 4 therein (in other words, the external layer 5 has an internal shape and size identical to the external shape and size of the internal layer 4). Further, internal surfaces (an inner side surfaces and inner bottom surface) of the external layer 5 have contact with (directly attached to) external faces (an outer side surfaces and outer bottom surface) of the internal layer 4. Furthermore, the external layer 5 is composed of the above-described molded article.

Accordingly, the tray member 2 is produced with the internal layer 4 and external layer 5 integrally molded into the above-described shape.

Specifically, first, the internal layer 4 is previously molded into the above-described shape. Around the internal layer 4, the above-described molding material is injected. Subsequently, the molding material is molded by heat compression molding under the above-described conditions to integrate the internal layer 4 with the external layer 5. In other words, in the battery pack housing 1 for electric vehicles, the tray member 2 integrally includes the aluminum member and the above-described molded article.

Additionally, as described above, the difference between the linear expansion coefficient of the molded article and that of the aluminum is small, and thus the battery pack housing 1 has excellent dimensional stability.

The cover member 3 has a plate shape to close the opening provided in the tray member 2, and has a size identical to that of the opening. The cover member 3 is composed of the above-described molded article.

Figure 2:
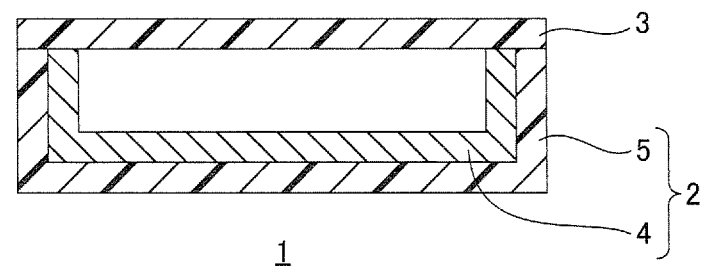
FIG. 2 is a cross-sectional view showing a tray member and a cover member combined in the battery pack housing for electric vehicles in FIG. 1.

In the battery pack housing 1 for electric vehicles, as shown in FIG. 2, the tray member 2 is combined with the cover member 3 so that the cover member 3 closes the opening provided in the tray member 2.

In other words, in the battery pack housing 1 for electric vehicles, the molded article is combined with the aluminum member.

As described above, the difference between the linear expansion coefficient of the molded article and the linear expansion coefficient of the aluminum is small, and therefore the dimensional stability is excellent.

The battery pack housing 1 for electric vehicles includes the cover member 3 composed of the above-described molded article and the external layer 5 composed of the above-described molded article, and therefore the battery pack housing 1 has excellent low shrinkage and excellent flame retardancy.

EXAMPLES

The specific numeral values used in the description below, such as mixing ratios (contents), physical property values, and parameters can be replaced with corresponding mixing ratios (contents), physical property values, parameters in the above-described "DESCRIPTION OF EMBODIMENTS", including the upper limit value (numeral values defined with "or less", and "less than") or the lower limit value (numeral values defined with "or more", and "more than"). The "parts" and "%" are based on mass unless otherwise specified.

1. Preparation of Unsaturated Polyester Resin

Synthesis Example 1

A flask equipped with a thermometer, nitrogen gas inlet tube, reflux condenser, and mixer was charged with 10.0 mol of maleic anhydride, 6.5 mol of propylene glycol, 4.0 mol of neopentyl glycol, and the mixture was subjected to polycondensation reaction at 200° C. to 210° C. while being stirred under nitrogen gas atmosphere, thereby producing unsaturated polyester with an acid value of 26.5 mgKOH/g. The acid value was measured by a method in accordance with JIS K6901 (2008). Relative to 100 parts by mass of the produced unsaturated polyester, 0.01 parts by mass of hydroquinone as a polymerization inhibitor and 66.7 parts by mass of styrene were added, and the mixture was stirred homogenously, thereby producing unsaturated polyester resin (styrene content 40%).

Synthesis Example 2

A flask equipped with a thermometer, nitrogen gas inlet tube, reflux condenser, and mixer was charged with 3.3 mol of isophthalic acid and 10.5 mol of propylene glycol, and the mixture was subjected to polycondensation reaction at 200° C. to 210° C. while being stirred under nitrogen gas atmosphere. Thereafter, when the acid value of the reaction product reached 20 mgKOH/g, the reaction product was cooled to 150° C., and 6.7 mol of maleic anhydride was charged, then the mixture was allowed to react again at 210° C. to 220° C., thereby producing unsaturated polyester with an acid value of 27.5 mgKOH/g. Relative to 100 parts by mass of the produced unsaturated polyester, 0.01 parts by mass of hydroquinone as a polymerization inhibitor and 66.7 parts by mass of styrene were added, and the mixture was stirred homogenously, thereby producing unsaturated polyester resin (styrene content 40%).

2. Preparation of Saturated Polyester Resin

Synthesis Example 3

A flask equipped with a thermometer, nitrogen gas inlet tube, reflux condenser, and mixer was charged with 4.0 mol of isophthalic acid and 10.5 mol of neopentyl glycol, and the mixture was subjected to polycondensation reaction at 200° C. to 210° C. while being stirred under nitrogen gas atmosphere. Thereafter, when the acid value of the reaction product reached 10 mgKOH/g, it was cooled to 150° C., and 6.0 mol of adipic acid was charged, and then the mixture was allowed to react again at 210° C. to 220° C., thereby producing saturated polyester with an acid value of 9.5 mgKOH/g. Relative to 100 parts by mass of the produced saturated polyester, 0.01 parts by mass of hydroquinone as a polymerization inhibitor and 66.7 parts by mass of styrene were added, and the mixture was stirred homogenously, thereby producing saturated polyester resin (styrene content 40%).

3. Preparation of Vinyl Ester Resin

Synthesis Example 4

A flask equipped with a mixer, reflux condenser, and gas inlet tube was charged with 114 parts by mass of bisphenol A (1.0 equivalent) and 555 parts by mass of bisphenol A epoxy resin (epoxy equivalent 185) (3.0 equivalent), and as a catalyst, 0.15 parts by mass of triethyl benzyl ammonium chloride, and the mixture was allowed to react at 150° C. for 5 hours while nitrogen was introduced, thereby producing non-brominated epoxy resin with an epoxy equivalent of 335. After the mixture was cooled to 120° C., 0.10 parts by mass of hydroquinone as a polymerization inhibitor, 1.50 parts by mass of tri ethyl benzyl ammonium chloride as a catalyst, and 176 parts by mass of methacrylic acid (2.05 equivalent) were added, and the mixture was allowed to react at 110° C. for 8 hours while air was introduced, thereby producing vinyl ester with an acid value of 8.5 mgKOH/g. Then, 563 parts by mass of styrene was added to the vinyl ester, thereby producing vinyl ester resin with a styrene content of 40 mass %.

4. Preparation of Brominated Vinyl Ester Resin

Synthesis Example 5

To the reaction vessel of Synthesis Example 3, as brominated epoxy resin, 400 parts by mass of tetra bromo bisphenol A epoxy resin (epoxy equivalent 400, bromine content 48.0%) (1.0 equivalent), 88.2 parts by mass of methacrylic acid (1.025 equivalent), 0.05 parts by mass of hydroquinone as a polymerization inhibitor, and 0.5 parts by mass of tri ethyl benzyl ammonium chloride as a catalyst, and the mixture was allowed to react at 110° C. for 8 hours while air was introduced, thereby producing brominated vinyl ester with an acid value of 9.0 mgKOH/g. Then, 325 parts by mass of styrene was added to the brominated vinyl ester, thereby producing brominated vinyl ester resin (bromine content 23.6%) containing 40 mass % of styrene.

5. Preparation of Unsaturated Polyester Resin Composition and Molding Material

Example 1

60 parts by mass of the unsaturated polyester resin (unsaturated polyester 36 parts by mass, styrene 24 parts by mass) of Synthesis Example 1, 15 parts by mass of polyvinyl acetate solution (40% styrene solution of polyvinyl acetate) (polyvinyl acetate 6 parts by mass, styrene 9 parts by mass) as a low profile agent, and 20 parts by mass of saturated polyester resin (saturated polyester 12 parts by mass, styrene 8 parts by mass) of Synthesis Example 3, 5 parts by mass of styrene as a polymerizable monomer, 10 parts by mass of phosphinic acid metal salt (OP1230 (trade name, Exolit OP1230, manufactured by Clariant International Ltd., phosphorus content 23%)), 0.05 parts by mass of p-benzoquinone as a polymerization inhibitor, 1.0 part by mass of t-butyl peroxy benzoate as the curing agent, 5 parts by mass of stearic acid zinc as the release agent, 10 parts by mass of black polyester toner (carbon black dispersed in polyester resin) as the coloring agent, 130 parts by mass of aluminum hydroxide (average particle size 8 μm), and 1 parts by mass of phosphoric acid polyester as the wetting and dispersing agent were mixed, thereby producing an unsaturated polyester resin composition.

To the unsaturated polyester resin composition, 0.8 parts by mass of magnesium oxide was added as the thickening agent, and thereafter, chopped glass, which is glass roving continuously cut into 25 mm, was added as the reinforced fiber, so that the glass content was 29.5 mass %. After a molding material (SMC) was obtained with a known SMC impregnation device, it was aged at 40° C. for 48 hours, and the viscosity of the molding material was increased until the molding material was ready for heat compression molding.

Example 2 to Example 9 and Comparative Example 1 to Comparative Example 7

A molding material was produced in the same manner as in Example 1, except that the mixing formulation was changed in accordance with Table 1 and Table 2.

In Example 5 and Example 9, for the fire retardant, poly phosphoric acid ammonium (trade name, Exolit AP422, manufactured by Clariant International Ltd., phosphorus content 31%) was used.

In Example 6 and Example 8, the vinyl ester resin of Synthesis Example 4 was used.

In Example 7, the brominated vinyl ester resin of Synthesis Example 5 was used.

In Comparative Example 2, for a low profile agent, polystyrene solution (35% styrene solution of polystyrene with weight-average molecular weight of about 250000) and polyethylene powder (polyethylene powder with average particle size of about 30 μm) were used.

In Comparative Example 5, for the filler, calcium carbonate with average particle size of about 3 μm was used.

6. Evaluation (Molding Compression Rate)

The molding material was subjected to heat compression molding using a flat metal plate of 300 mm×300 mm, thereby producing a flat-plate molded article having a thickness of 4 mm.

The molding was carried out with the following conditions: the mold temperature with the product side and the reverse side of 140° C., molding pressure 10 MPa, and retaining time inside the mold 420 seconds. Thereafter, the molded article was demolded from the mold, and immediately cooled between iron plates. Thereafter, the molded article was allowed to stand at 25° C. for 24 hours, and the four sides of the molded article at 25° C. were measured, and the compression rate was measured by the ratio with the size of the above-described flat plate mold. The results are shown in Tables 3 and 4.

Evaluation was carried out based on the following criteria regarding the compression rate. The results are shown in Tables 3 and 4.

Evaluation Criteria:
Excellent: compression rate was 0 or less.
Good: compression rate was 0 or more and less than 0.10.
Bad: compression rate was 0.10 or more.

(Flame Retardancy)

A molding material was produced in the same manner as the production of the molding compression rate measurement flat plates, thereby producing molded plates with a thickness of 4 mm, 3 mm, and 2.5 mm. A test piece was cut out from the molded plates, and a flammability test of UL standard (Underwriters Laboratories Inc.) in accordance with UL94 standard (flammability of plastic materials) was carried out. Each of the test pieces with a thickness of 4 mm, 3 mm, and 2.5 mm was evaluated if it satisfied V-0 standard. The results are shown in Tables 3 and 4.

The flame retardancy was evaluated based on the following standard. The results are shown in Tables 3 and 4.

Evaluation Criteria:
Excellent: conformable to V-0 standard (thickness 2.5 mm).
Good: conformable to V-0 standard (thickness 3 mm).
Bad: not conformable to V-0 standard (thickness 4 mm).

(Linear Expansion Coefficient)

The flat plate molded article (a thickness of 4 mm) used for the molding compression rate measurement was cut out to produce a test piece (4 mm×4 mm×5 mm), and the linear expansion coefficient of the molded article in horizontal direction was measured with a thermomechanical analyzer (manufactured by Hitachi High-Tech Science Corporation, EXSTAR TMA SS7100) using an expansion/compression probe. The temperature was increased at a temperature increase rate of 5° C./min from room temperature to 100° C., and the linear expansion coefficient in the range of 50° C. to 80° C. was measured. The results are shown in Tables 3 and 4.

The difference between the obtained linear expansion coefficient and the linear expansion coefficient of aluminum (23.0 ppm/° C.) is shown in Tables 3 and 4.

Linear expansion coefficient was evaluated based on the following. The results are shown in Tables 3 and 4.
  Excellent: the absolute value of the difference between the obtained linear expansion coefficient and the linear expansion coefficient of aluminum was 0 or more and less than 1.2.
  Good: the absolute value of the difference between the obtained linear expansion coefficient and the linear expansion coefficient of aluminum was 1.2 or more and less than 2.
  Fair: the absolute value of the difference between the obtained linear expansion coefficient and the linear expansion coefficient of aluminum was 2 or more and less than 4.
  Bad: the absolute value of the difference between the obtained linear expansion coefficient and the linear expansion coefficient of aluminum was 4 or more.

(Smoke Generation)

In the above-described flame retardancy test, in the V-0 determination test using a test piece with a thickness of 3 mm, occurrence of black smoke at the time of burning was visually checked.

Smoke generation was evaluated based on the following criteria. The results are shown in Tables 3 and 4.
  Good: no black smoke generated.
  Bad: black smoke generated.

(Production Stability)
<Evaluation on Impregnation State>

Immediately after the SMC production, the carrier film was stripped off with a cutter knife, and impregnation state of glass fiber with the unsaturated polyester resin composition was evaluated visually.

Impregnation state was evaluated based on the following criteria. The results are shown in Tables 3 and 4.
  Good: glass fiber was sufficiently wet with unsaturated polyester resin composition, and no glass fiber not impregnated with unsaturated polyester resin composition was observed.
  Bad: glass fiber was not impregnated with the unsaturated polyester resin composition was partially found.

<Evaluation on Film Releasability>

The carrier film of the aged molding material (SMC) was stripped off with a cutter knife, and film releasability was evaluated.

Film releasability was evaluated based on the following criteria. The results are shown in Tables 3 and 4.
  Good: film was released smoothly with few tucks on SMC
  Bad: obvious tucks were found on SMC. Alternatively, separation of components was observed partially when the film was released.

(Density)

A test piece was cut out from the flat plate molded article (a thickness of 4 mm) used for the molding compression rate measurement, and density was measured in accordance with JIS K6911 (1995). The results are shown in Tables 3 and 4.

(Flexural Properties)

A test piece (length 80 mm, width 10 mm) was cut out from the flat plate molded article (a thickness of 4 mm) used for the molding compression rate measurement, and flexural strength and flexural modulus were measured at 23° C. and 90° C. in accordance with JIS K7017 (1999). The results are shown in Tables 3 and 4.

Furthermore, from the measurement results of flexural modulus and density, specific rigidity at 23° C. and 90° C. was calculated based on formula (1) below. The results are shown in Tables 3 and 4.

$$\text{Specific rigidity} = (\text{flexural modulus})^{1/3}/(\text{density}) \quad (1)$$

(Tensile Properties)

A test piece was cut out from the flat plate molded article (a thickness of 4 mm) used for the molding compression rate measurement, and tensile strength and tensile modulus were measured at 23° C. in accordance with JIS K7164 (2005). The results are shown in Tables 3 and 4.

TABLE 1

| Example No. | | | Unit | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|
| Resin component | Unsaturated polyester resin | Unsaturated polyester resin of Synthesis Ex. 1 | Parts by mass | 60 | 60 | 60 | 60 | 60 | 55 | 55 | 55 | 60 |
| | | Unsaturated polyester resin of Synthesis Ex. 2 | Parts by mass | — | — | — | — | — | — | — | — | — |
| | Polymerizable monomer | Styrene | Parts by mass | 5 | 5 | 5 | 5 | 5 | 4 | 4 | 4 | 5 |
| | Low profile agent | Polyvinyl acetate solution | Parts by mass | 15 | 15 | 15 | 15 | 15 | 16 | 16 | 16 | 15 |
| | | Saturated polyester resin of Synthesis Ex. 3 | Parts by mass | 20 | 20 | 20 | 20 | 20 | — | — | — | 20 |
| | | Polystyrene solution | Parts by mass | — | — | — | — | — | — | — | — | — |
| | | Polyethylene powder | Parts by mass | — | — | — | — | — | — | — | — | — |
| | Other thermosetting resin | Vinyl ester resin of Synthesis Ex. 4 | Parts by mass | — | — | — | — | — | 25 | — | 25 | — |
| | | Brominated vinyl ester resin of Synthesis Ex. 5 | Parts by mass | — | — | — | — | — | — | 25 | — | — |

TABLE 1-continued

| Example No. | | | Unit | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|
| | Aluminum hydroxide | | Parts by mass | 130 | 110 | 60 | 110 | 120 | 120 | 120 | 120 | 110 |
| Fire retardant | Phosphorus fire retardant | OP1230 | Parts by mass | 10 | 20 | 40 | — | — | — | — | 10 | — |
| | | AP422 | Parts by mass | — | — | — | — | 20 | — | — | — | 80 |
| | Bromine fire retardant | BPBPE (Bis penta bromo phenyl ethane) | Parts by mass | — | — | — | 15 | — | 15 | — | — | — |
| | Antimony oxide | Diantimony trioxide | Parts by mass | — | — | — | 5 | — | 5 | 4 | — | — |
| Polymerization inhibitor | p-Benzoquinone | | Parts by mass | 0.05 | 0.05 | 0.05 | 0.05 | 0.05 | 0.05 | 0.05 | 0.05 | 0.05 |
| Curing agent | t-butyl peroxy benzoate | | Parts by mass | 1.0 | 1.0 | 1.0 | 1.0 | 1.0 | 1.0 | 1.0 | 1.0 | 1.0 |
| Release agent | Zinc Stearate | | Parts by mass | 5 | 5 | 5 | 5 | 5 | 5 | 5 | 5 | 5 |
| Coloring agent | Black polyester toner | | Parts by mass | 10 | 10 | 10 | 10 | 10 | 10 | 10 | 10 | 10 |
| Filler | Calcium carbonate | | Parts by mass | — | — | — | — | — | — | — | — | — |
| Wetting and dispersing agent | Phosphoric acid polyester | | Parts by mass | 1 | 1 | 1 | 1 | 1 | 1 | 1 | 1 | 1 |
| Thickening agent | Magnesium oxide | | Parts by mass | 0.8 | 0.8 | 0.8 | 0.8 | 0.8 | 0.8 | 0.8 | 0.8 | 0.8 |
| Reinforced fiber | Glass fiber (fiber length (25 mm)) | | % | 29.5 | 30 | 32 | 30 | 30 | 29.5 | 29.5 | 45 | 31 |
| Mixing ratio of the polybasic acid having an ethylenic unsaturated double bond relative to 100 mol % of polybasic acid | | | Parts by mass | 100 | 100 | 100 | 100 | 100 | 100 | 100 | 100 | 100 |
| Mixing ratio of the polyvinyl acetate relative to 100 parts by mass of resin component | | | Parts by mass | 6 | 6 | 6 | 6 | 6 | 6.4 | 6.4 | 6.4 | 6 |
| Mixing ratio of the aluminum hydroxide relative to 100 parts by mass of resin component | | | Parts by mass | 130 | 110 | 60 | 110 | 120 | 120 | 120 | 120 | 110 |
| Mixing ratio of the fire retardant relative to 100 parts by mass of aluminum hydroxide | | | Parts by mass | 7.7 | 18 | 67 | 18 | 17 | 17 | 3.3 | 8.3 | 73 |
| Volume content in molding material | Filler-excluding component | | vol % | 54.2 | 58.1 | 67.5 | 56.4 | 55.8 | 55.9 | 54.1 | 47.4 | 60.1 |
| | Aluminum hydroxide | | vol % | 25.6 | 21.8 | 12.4 | 22.7 | 23.6 | 23.7 | 25.4 | 20.1 | 18.1 |
| | Filler | Calcium carbonate | vol % | — | — | — | — | — | — | — | — | — |
| | Reinforced fiber | | vol % | 20.2 | 20.1 | 20.2 | 20.9 | 20.7 | 20.3 | 20.4 | 32.4 | 21.7 |

TABLE 2

| Comparative Example No. | | | Unit | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|---|
| Resin component | Unsaturated polyester resin | Unsaturated polyester resin of Synthesis Ex. 1 | Parts by mass | — | 60 | 60 | 50 | 60 | 60 | 60 | 60 |
| | | Unsaturated polyester resin of Synthesis Ex. 2 | Parts by mass | 60 | — | — | — | — | — | — | — |
| | Polymerizable monomer | Styrene | Parts by mass | 5 | 10 | 15 | — | 5 | 5 | 5 | 5 |
| | Low profile agent | Polyvinyl acetate solution | Parts by mass | 15 | — | 5 | 30 | 15 | 15 | 15 | 15 |
| | | Saturated polyester resin of Synthesis Ex. 3 | Parts by mass | 20 | — | 20 | 20 | 20 | 20 | 20 | 20 |
| | | Polystyrene solution | Parts by mass | — | 20 | — | — | — | — | — | — |
| | | Polyethylene powder | Parts by mass | — | 10 | — | — | — | — | — | — |
| | Other thermosetting resin | Vinyl ester resin of Synthesis Ex. 4 | Parts by mass | — | — | — | — | — | — | — | — |
| | | Brominated vinyl ester resin of Synthesis Ex. 5 | Parts by mass | — | — | — | — | — | — | — | — |

TABLE 2-continued

|  |  | Unit | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| Comparative Example No. |  |  |  |  |  |  |  |  |  |  |
| Fire retardant | Aluminum hydroxide | Parts by mass | 110 | 110 | 110 | 110 | — | 40 | 160 | 110 |
|  | Phosphorus fire retardant OP1230 | Parts by mass | 20 | 20 | 20 | 20 | 20 | 20 | 20 | — |
|  | AP422 | Parts by mass | — | — | — | — | — | — | — | — |
|  | Bromine fire retardant BPBPE (Bis penta bromo phenyl ethane) | Parts by mass | — | — | — | — | — | — | — | — |
|  | Antimony oxide Diantimony trioxide | Parts by mass | — | — | — | — | — | — | — | — |
| Polymerization inhibitor | p-Benzoquinone | Parts by mass | 0.05 | 0.05 | 0.05 | 0.05 | 0.05 | 0.05 | 0.05 | 0.05 |
| Curing agent | t-butyl peroxy benzoate | Parts by mass | 1.0 | 1.0 | 1.0 | 1.0 | 1.0 | 1.0 | 1.0 | 1.0 |
| Release agent | Zinc Stearate | Parts by mass | 5 | 5 | 5 | 5 | 5 | 5 | 5 | 5 |
| Coloring agent | Black polyester toner | Parts by mass | 10 | 10 | 10 | 10 | 10 | 10 | 10 | 10 |
| Filler | Calcium carbonate | Parts by mass | — | — | — | — | 115 | — | — | — |
| Wetting and dispersing agent | Phosphoric acid polyester | Parts by mass | 1 | 1 | 1 | 1 | 1 | 1 | 1 | 1 |
| Thickening agent | Magnesium oxide | Parts by mass | 0.8 | 0.8 | 0.8 | 0.8 | 0.8 | 0.8 | 0.8 | 0.8 |
| Reinforced fiber | Glass fiber (fiber length (25 mm)) | % | 30 | 30 | 30 | 30 | 30 | 34 | 29 | 30 |
| Mixing ratio of the polybasic acid having an ethylenic unsaturated double bond relative to 100 mol % of polybasic acid |  | Parts by mass | 67 | 100 | 100 | 100 | 100 | 100 | 100 | 100 |
| Mixing ratio of the polyvinyl acetate relative to 100 parts by mass of resin component |  | Parts by mass | 6 | — | 2 | 12 | 6 | 6 | 6 | 6 |
| Mixing ratio of the aluminum hydroxide relative to 100 parts by mass of resin component |  | Parts by mass | 110 | 110 | 110 | 110 | — | 40 | 160 | 110 |
| Mixing ratio of the fire retardant relative to 100 parts by mass of aluminum hydroxide |  | Parts by mass | 18 | 18 | 18 | 18 | — | 50 | 12.5 | — |
| Volume content in molding material | Filler-excluding component | vol % | 57.9 | 58.1 | 58.1 | 58.1 | 59.6 | 70.1 | 52.2 | 55.7 |
|  | Aluminum hydroxide | vol % | 22.0 | 21.8 | 21.8 | 21.8 | — | 9.4 | 27.7 | 24.0 |
|  | Filler Calcium carbonate | vol % | — | — | — | — | 20.1 | — | — | — |
|  | Reinforced fiber | vol % | 20.2 | 20.1 | 20.1 | 20.1 | 20.3 | 20.5 | 20.1 | 20.3 |

TABLE 3

| Example No. |  |  | Unit | Ex. 1 | Ex. 2 | Ex. 3 | Ex. 4 |
|---|---|---|---|---|---|---|---|
| Evaluation | Molding compression rate | Compression rate | % | −0.03 | −0.02 | 0.00 | −0.05 |
|  |  | Evaluation | — | Excellent | Excellent | Excellent | Excellent |
|  | Flame retardancy | Evaluation | — | Good | Excellent | Excellent | Excellent |
|  |  | V-0 standard (thickness 4 mm) | — | Conformable | Conformable | Conformable | Conformable |
|  |  | V-0 standard (thickness 3 mm) | — | Conformable | Conformable | Conformable | Conformable |
|  |  | V-0 standard (thickness 2.5 mm) | — | Not conformable | Conformable | Conformable | Conformable |
|  | Linear expansion coefficient | Linear expansion coefficient | ppm/° C. | 21.4 | 22.0 | 24.0 | 21.9 |
|  |  | Absolute value of difference of linear expansion coefficient of aluminum | — | 1.6 | 1.0 | 1.0 | 1.1 |
|  |  | Evaluation | — | Good | Excellent | Excellent | Excellent |
|  | Smoke production |  | — | — | Good | Good | Bad |
|  | Production stability | Impregnated state/film release | — | Good/Good | Good/Good | Good/Good | Good/Good |

TABLE 3-continued

| | | | | | | |
|---|---|---|---|---|---|---|
| | Density | g/mL | 1.74 | 1.70 | 1.60 | 1.77 |
| Flexural properties (23° C.) | Flexural modulus | GPa | 12.1 | 11.9 | 12.0 | 12.2 |
| | Flexural strength | MPa | 222 | 218 | 221 | 219 |
| | Specific rigidity | $(MPa)^{1/3}/(g/mL)$ | 13.2 | 13.4 | 14.3 | 13.0 |
| Flexural properties (90° C.) | Flexural modulus | GPa | 9.2 | 9.2 | 9.2 | 9.3 |
| | Flexural strength | MPa | 142 | 142 | 142 | 141 |
| | Specific rigidity | $(MPa)^{1/3}/(g/mL)$ | 12.0 | 12.3 | 13.1 | 11.9 |
| Tensile properties | Tensile modulus | GPa | 12.5 | 12.5 | 12.5 | 12.4 |
| | Tensile strength | MPa | 110 | 110 | 110 | 109 |

| | | | Ex. 5 | Ex. 6 | Ex. 7 | Ex. 8 | Ex. 9 |
|---|---|---|---|---|---|---|---|
| | Example No. | | | | | | |
| Evaluation | Molding compression rate | Compression rate | −0.05 | 0.08 | 0.08 | 0.08 | −0.02 |
| | | Evaluation | Excellent | Good | Good | Good | Excellent |
| | Flame retardancy | Evaluation | Excellent | Excellent | Excellent | Good | Excellent |
| | | V-0 standard (thickness 4 mm) | Conformable | Conformable | Conformable | Conformable | Conformable |
| | | V-0 standard (thickness 3 mm) | Conformable | Conformable | Conformable | Conformable | Conformable |
| | | V-0 standard (thickness 2.5 mm) | Conformable | Conformable | Conformable | Not conformable | Conformable |
| | Linear expansion coefficient | Linear expansion coefficient | 21.5 | 21.6 | 21.6 | 21.6 | 21.9 |
| | | Absolute value of difference of linear expansion coefficient of aluminum | 1.5 | 1.4 | 1.4 | 1.4 | 1.1 |
| | | Evaluation | Good | Good | Good | Good | Excellent |
| | Smoke production | | Good | Bad | Bad | Good | Good |
| | Production stability | Impregnated state/film release | Good/Good | Good/Good | Good/Good | Good/Good | Bad/Good |
| | Density | | 1.75 | 1.75 | 1.76 | 1.83 | 1.78 |
| Flexural properties (23° C.) | Flexural modulus | | 12.1 | 13.2 | 13.1 | 13.3 | 11.9 |
| | Flexural strength | | 219 | 233 | 228 | 229 | 216 |
| | Specific rigidity | | 13.1 | 13.5 | 13.4 | 12.9 | 12.8 |
| Flexural properties (90° C.) | Flexural modulus | | 9.2 | 10.0 | 10.8 | 11.7 | 9.2 |
| | Flexural strength | | 142 | 148 | 155 | 162 | 139 |
| | Specific rigidity | | 12.0 | 12.3 | 12.6 | 12.4 | 11.8 |
| Tensile properties | Tensile modulus | | 12.5 | 14.0 | 14.0 | 14.0 | 12.4 |
| | Tensile strength | | 110 | 118 | 118 | 118 | 110 |

TABLE 4

| Comparative Example No. | | Unit | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| Evaluation | Molding compression rate | Compression rate | % | 0.10 | 0.18 | 0.13 | −0.05 | −0.03 | 0.02 | −0.02 | −0.02 |
| | | Evaluation | — | Bad | Bad | Bad | Excellent | Excellent | Good | Excellent | Excellent |
| | Flame retardancy | Evaluation | — | Excellent | Excellent | Excellent | Excellent | Bad | Bad | Excellent | Bad |
| | | V-0 standard (thickness 4 mm) | — | Conformable | Conformable | Conformable | Conformable | Not conformable | Not conformable | Conformable | Not conformable |
| | | V-0 standard (thickness 3 mm) | — | Conformable | Conformable | Conformable | Conformable | Not conformable | Not conformable | Conformable | Not conformable |
| | | V-0 standard (thickness 2.5 mm) | — | Conformable | Conformable | Conformable | Conformable | Not conformable | Not conformable | Conformable | Not conformable |
| | Linear expansion coefficient | Linear expansion coefficient | ppm/°C. | 22.0 | 22.0 | 22.0 | 22.0 | 17.0 | 26.0 | 17.5 | 22.0 |
| | | Absolute value of difference of linear expansion coefficient of aluminum | — | 1.0 | 1.0 | 1.0 | 1.0 | 6.0 | 3.0 | 5.5 | 1.0 |
| | | Evaluation | — | Excellent | Excellent | Excellent | Excellent | Bad | Fair | Bad | Excellent |
| | Smoke production | | — | — | Good | Good | Good | Good | Good | Good | Good |
| Production stability | Impregnated state/film release | | — | Good/Good | Good/Good | Good/Good | Good/Bad | Good/Good | Bad/Bad | Good/Good | Good/Good |
| | Density | | g/mL | 1.71 | 1.7 | 1.70 | 1.70 | 1.72 | 1.53 | 1.76 | 1.72 |
| Flexural properties (23° C.) | Flexural modulus | | GPa | 11.8 | 11.7 | 11.8 | 11.9 | 11.9 | 10.9 | 12.3 | 11.8 |
| | Flexural strength | | MPa | 221 | 220 | 217 | 219 | 218 | 217 | 217 | 217 |
| | Specific rigidity | | (MPa)$^{1/3}$/(g/mL) | 13.3 | 13.4 | 13.4 | 13.4 | 13.3 | 14.5 | 13.1 | 13.2 |
| Flexural properties (90° C.) | Flexural modulus | | GPa | 9.1 | 9.2 | 9.2 | 9.1 | 9.2 | 8.8 | 9.4 | 9.3 |
| | Flexural strength | | MPa | 138 | 141 | 139 | 140 | 142 | 142 | 139 | 143 |
| | Specific rigidity | | (MPa)$^{1/3}$/(g/mL) | 12.2 | 12.3 | 12.3 | 12.3 | 12.2 | 13.5 | 12.0 | 12.2 |
| Tensile properties | Tensile modulus | | GPa | 12.3 | 12.6 | 12.4 | 12.5 | 12.5 | 11.0 | 12.7 | 12.6 |
| | Tensile strength | | MPa | 112 | 111 | 109 | 110 | 110 | 109 | 111 | 111 |

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The unsaturated polyester resin composition, molding material, and molded article of the present invention can be suitably used for a battery pack housing for electric vehicles.

The battery pack housing for electric vehicles of the present invention can be suitably used for vehicles requiring low shrinkage, flame retardancy, and dimensional stability.

DESCRIPTION OF REFERENCE NUMERALS 1 battery pack housing for electric vehicles
4 internal layer
5 external layer

The invention claimed is:

1. An unsaturated polyester resin composition comprising:

a resin component comprising an unsaturated polyester, a polymerizable monomer, and a low profile agent; aluminum hydroxide; and a fire retardant, wherein the unsaturated polyester is a polymerized product of polybasic acid and an alkane diol, the polybasic acid contains an ethylenic unsaturated double bond-containing polybasic acid in an amount of 80 mol % or more relative to 100 mol % of the polybasic acid, the low profile agent contains polyvinyl acetate and a saturated polyester, the saturated polyester is a polymerized product of both isophthalic acid and adipic acid and a neopentyl glycol, the fire retardant includes at least one selected from the group consisting of a halogen fire retardant and a non-halogen fire retardant, the non-halogen fire retardant includes at least one selected from the group consisting of a phosphorus fire retardant, an inorganic fire retardant, and a nitrogen compound fire retardant, the phosphorus fire retardant includes at least one selected from the group consisting of red phosphorus, phosphoric acid ester, poly phosphoric acid salt, an IFR expandable fire retardant, and phosphinic acid metal salt, an amount of the unsaturated polyester is 20 mass % or more and 60 mass % or less relative to the resin component, an amount of the polymerizable monomer is 20 mass % or more and 50 mass % or less relative to the resin component, an amount of the polyvinyl acetate is 3 parts by mass or more and 10 parts by mass or less relative to 100 parts by mass of the resin component, an amount of the saturated polyester is 8 parts by mass or more and 15 parts by mass or less relative to 100 parts by mass of the resin component, and an amount of the aluminum hydroxide is 60 parts by mass or more and 130 parts by mass or less relative to 100 parts by mass of the resin component.

2. The unsaturated polyester resin composition according to claim 1, wherein
an amount of the fire retardant is 15 parts by mass or more and 70 parts by mass or less relative to 100 parts by mass of the aluminum hydroxide.

3. The unsaturated polyester resin composition according to claim 1, wherein the fire retardant is the phosphorus fire retardant.

4. A molding material comprising:
the unsaturated polyester resin composition according to claim 1; and a reinforced fiber, wherein, in the unsaturated polyester resin composition, a filler-excluding component is contained in total of 40 vol % or more and 70 vol % or less, the filler-excluding component being a component excluding the aluminum hydroxide and a filler blended as necessary in the unsaturated polyester resin composition.

5. A molded article comprising a cured product of the molding material according to claim 4.

6. The molded article according to claim 5 having a linear expansion coefficient of 20 ppm/° C. or more and 25 ppm/° C. or less.

7. The molded article according to claim 5 to be used for a battery pack housing for electric vehicles.

8. A battery pack housing for electric vehicles integrally containing: an aluminum member; and the molded article according to claim 5.

9. The unsaturated polyester resin composition according to claim 1,
wherein the amount of the fire retardant is 3 parts by mass or more and 80 parts by mass or less relative to 100 parts by mass of the aluminum hydroxide.

10. The unsaturated polyester resin composition according to claim 1,
wherein the unsaturated polyester is a polymerized product of a reaction composition consisting of polybasic acid and an alkane diol, and optionally at least one of solvent or catalyst.

11. The unsaturated polyester resin composition according to claim 1,
wherein the halogen fire retardant includes a bromine fire retardant,
wherein the bromine fire retardant includes at least one selected from the group consisting of hexa bromo benzene, bromo diphenyl, and bromo diphenyl ether,
wherein the non-halogen fire retardant includes at least one selected from the group consisting of a phosphorus fire retardant, an inorganic fire retardant, and a nitrogen compound fire retardant,
wherein the phosphorus fire retardant includes at least one selected from the group consisting of phosphoric acid ester, poly phosphoric acid salt, an IFR expandable fire retardant, and phosphinic acid metal salt, and
wherein the inorganic fire retardant includes at least one selected from the group consisting of antimony oxide, zinc stannate, boric acid zinc, and formulation thereof.

12. The unsaturated polyester resin composition according to claim 1,
wherein the fire retardant includes a non-halogen fire retardant,
wherein the non-halogen fire retardant includes at least one selected from the group consisting of a phosphorus fire retardant, an inorganic fire retardant, and a nitrogen compound fire retardant,
wherein the phosphorus fire retardant includes at least one selected from the group consisting of phosphoric acid ester, poly phosphoric acid salt, an IFR expandable fire retardant, and phosphinic acid metal salt, and
wherein the inorganic fire retardant includes at least one selected from the group consisting of an antimony oxide, zinc stannate, boric acid zinc, and formulation thereof.

13. The unsaturated polyester resin composition according to claim 3,
wherein the phosphorus fire retardant includes at least one selected from the group consisting of phosphoric acid ester, poly phosphoric acid salt, an IFR expandable fire retardant, and phosphinic acid metal salt.

14. The unsaturated polyester resin composition according to claim 3,
wherein the phosphorus fire retardant includes at least one selected from the group consisting of poly phosphoric acid ammonium and phosphinic acid metal salt.

* * * * *